(12) United States Patent
Anderson et al.

(10) Patent No.: US 8,706,751 B2
(45) Date of Patent: Apr. 22, 2014

(54) METHOD FOR PROVIDING A USER INTERFACE DRIVEN BY DATABASE TABLES

(75) Inventors: Mark John Anderson, Oronoco, MN (US); David Stanley Charron, Rochester, MN (US); James Michael Flanagan, Rochester, MN (US); Scott L. Forstie, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2185 days.

(21) Appl. No.: 11/610,068

(22) Filed: Dec. 13, 2006

(65) Prior Publication Data

US 2008/0147602 A1 Jun. 19, 2008

(51) Int. Cl.
*G06F 17/30* (2006.01)

(52) U.S. Cl.
CPC ................... *G06F 17/30306* (2013.01)
USPC .......................................... 707/769

(58) Field of Classification Search
CPC .................................. G06F 17/30306
USPC .................................. 707/2–6, 769
See application file for complete search history.

(56) References Cited

U.S. PATENT DOCUMENTS

| 5,608,899 A | 3/1997 | Li et al. |
| 5,911,138 A * | 6/1999 | Li et al. ............................. 707/3 |
| 7,499,907 B2 * | 3/2009 | Brown et al. ...................... 707/2 |
| 7,584,172 B2 * | 9/2009 | Heuer et al. ......................... 1/1 |
| 2006/0235835 A1 | 10/2006 | Dettinger et al. |

OTHER PUBLICATIONS

Charron, David; "On the Right Path—iSeries Navigator database tools get new look, improved functionality with V5R4", IBM Systems Magazine, May 2006, pp. 1-10 URL: http://www.ibmsystemsmag.com/i5/may06/features/7990p1.aspx>.

Haas, L M et al; "Data Integration Through Database Federation", IBM Systems Journal, IBM Corporation, Armonk, New York, US, vol. 41, No. 4, Jan. 1, 2002, pp. 578-596.

* cited by examiner

*Primary Examiner* — Huawen Peng
(74) *Attorney, Agent, or Firm* — Patterson & Sheridan LLP (57) ABSTRACT

Embodiments of the invention provide a method, article of manufacture, and an apparatus used to provide an interface driven by database tables. The method includes receiving a query identifier associated with a database query. The query is executed to generate a set of query results, and a set of actions associated with the set of query result is also identified. The set of query results and the set of actions are provided to a client component of the database-driven interface.

18 Claims, 10 Drawing Sheets

CALL qsys2.process_detailed_monitor ("SQG001",1,null,null,null, QUSRSYS', 'QAUGBPMD2','MJA... - Z2332p1(Z2332p1)

| SQL Statements | Users | Jobs | Threads | Average Table Rows | Average Rows Returned |
|---|---|---|---|---|---|
| 1564 | 1 | 5 | 5 | 219981.786 | 439.396 |

| | ACTIONID | ACTIONTEXT |
|---|---|---|
| | DRB090 | SQL Statement Summary |
| | ERB090 | SQL Statements |
| | SQU001 | User Summary |
| | SQJ001 | Job Summary |
| | DROP91 | SQE Statement Summary |
| | EROP91 | SQE Statements |
| | DROP92 | CQE Statement Summary |
| | EROP92 | CQE Statements |
| | DRB091 | System Naming Summary |
| | ERB091 | System Naming Statements |
| | DRB092 | SQL Naming Summary |
| | ERB092 | SQL Naming Statements |
| | DRB0A4 | Unique Open Statement Summary |
| | DRO191 | Full Opens - Summary |
| | ERO191 | Full Opens - Statements |
| | DRO191 | Open Summary |
| | ERO191 | Open Statements |
| | DRMU91 | MQT Used Summary |
| | ERMU91 | MQT Used Statements |
| | DRIU91 | Index Used Summary |
| | ERIU91 | Index Used Statements |
| | DRIC91 | Full Index Create Summary |
| | ERIC91 | Full Index Create Statements |

Title bar: CALL qsys2.process_detailed_monitor ("SQG001",1,null...

| Runtime | Statement Outcome | SQLS... | SQLCODE | Operation | Statement Text |
|---|---|---|---|---|---|
| 11.204768 | Successful | Visual Explain | | | insert into DWQRY.ZZ2SI00Y00 select a12.DS_ID D |
| 11.660072 | Successful | Work with SQL Statement | | | insert into DWQRY.ZZ2SE00U00 select a11.DSC_ID |
| 10.605112 | Successful | SQL Statements with the Same Join Fiel | | | insert into DWQRY.ZZ2SA00Q00 select a12.DS_ID D |
| 12.889376 | Successful | SQL Statements with the Same Statement Text | | | insert into DWQRY.ZZ2S900B00 select a12.DEPT_N |
| 10.46576 | Successful | Copy to Performance Monitor | | | insert into DWQRY.ZZ2SR01M00 select a12.DEPT_N |
| 2.207816 | Successful | 00000 | | 0 INSERT | insert into DWQRY.ZZ2SA00Q01 select a14.DS_ID D |
| 1.488216 | Successful | 00000 | | 0 INSERT | insert into DWQRY.ZZ2SI00Y01 select a14.DS_ID D |
| 1.13348 | Successful | 00000 | | 0 INSERT | insert into DWQRY.ZZ2SE00U01 select a11.DSC_ID |
| 0.741912 | Successful | 00000 | | 0 INSERT | insert into DWQRY.ZZ2S900B01 select a14.DEPT_N |
| 8.73684 | Successful | 00000 | | 0 INSERT | insert into DWQRY.ZZ2SR01M01 select a14.DEPT_N |
| 1.642464 | Successful | 00000 | | 0 INSERT | insert into DWQRY.ZZ2SA00Q02 select distinct? Cus |
| 1.8452 | Successful | 00000 | | 0 INSERT | insert into DWQRY.ZZ2SI00Y02 select distinct? Cust |
| 1.748936 | Successful | 00000 | | 0 INSERT | insert into DWQRY.ZZ2SE00U02 select distinct? Cust |
| 1.831792 | Successful | 00000 | | 0 INSERT | insert into DWQRY.ZZ2S900B02 select distinct? Cust |
| 0.217072 | Successful | 00000 | | 0 INSERT | insert into DWQRY.ZZ2SI00Y03 select (VALUE(sum |
| 0.521792 | Successful | 00000 | | 0 INSERT | insert into DWQRY.ZZ2SA00Q03 select (VALUE(sum |

METHOD FOR PROVIDING A USER INTERFACE DRIVEN BY DATABASE TABLES

BACKGROUND OF THE INVENTION

1. Field of the Invention

The present invention generally relates to computer user interfaces. More specifically, the present invention relates to generating a user interface using database tables to store the data and actions available to the user.

2. Description of the Related Art

A computer user interface allows a user to send commands to a computer, and to receive the resulting responses from the computer. In the case of client-server computer systems, an interface application on a client computer allows a user to interact with a remote server. The interface application usually consists of one or more screen displays that the user can select and interact with, and where each screen display has a particular focus or purpose.

Typically, the underlying computer code used to generate an interface is written to implement one screen at a time. This is because each screen will usually have different elements and functions from other screens, thus requiring the code to be individualized for each screen. However, this traditional approach can cause problems. If the application requires a large number of screens, a large amount of code will have to be written. If the application is later changed, the coding of any affected screens has to be individually changed and debugged. In some cases, a change to one screen will require changes in many linked screens, leading to an escalation of the work required. This process can be time-consuming and error-prone. Further, if the client application is not based on a web browser, the software may have to be updated on every client computer. If there are a large number of client computers, this process can be expensive and time-consuming.

Accordingly, there is a need for a method of generating user interfaces that does not require writing and changing the code for each screen separately, and that does not require the updating of software on every client computer.

SUMMARY OF THE INVENTION

Embodiments of the invention include a method of providing a database-driven user interface. The method generally includes receiving a query identifier, from a set of query identifiers, wherein each query identifier corresponds to a database query in a set of database queries, and executing the database query associated with the received query identifier to generate a set of query results. The method also includes identifying a set of actions associated with the set of query results and returning the set of query results and the set of actions to a client component of the database-driven interface. In response, the client component may be configured to display the set of query results and allow a user to invoke each of the set of actions associated with the set of query results.

Further, each action, of the set of actions, may be associated with one or more of the set of the query identifiers, and when a given action is invoked by the user, the query identifier associated with that action may be transmitted to a server component of the database-driven interface.

Embodiments of the invention also include a computer readable medium containing a program which, when executed, performs an operation for providing a database driven interface. The operations generally include receiving a query identifier, from a set of query identifiers, wherein each query identifier corresponds to a database query in a set of database queries, and executing the database query associated with the received query identifier to generate a set of query results. The operations also include identifying a set of actions associated with the set of query results and returning the set of query results and the set of actions to a client component of the database driven interface. In response, the client component may be configured to display the set of query results and allow a user to invoke each of the set of actions associated with the set of query results.

Embodiments of the invention also include a system having a processor and a memory. The memory may contain a program that provides a database-driven interface. The program may be configured to receive a query identifier, from a set of query identifiers, wherein each query identifier corresponds to a database query in a set of database queries and execute the database query associated with the received query identifier to generate a set of query results. The program may be further configured to identify a set of actions associated with the set of query results; and to return the set of query results and the set of actions to a client component of the database driven interface. In response, the client component may be configured to display the set of query results and allow a user to invoke each of the set of actions associated with the set of query results.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention include methods for providing a user interface driven by database tables. Generally, embodiments of the invention allow a user interface to be defined and maintained in database tables. Doing so may reduce the cost of creating and maintaining client-server applications. In one embodiment, a user of a client application is presented with a set of available actions. When the user selects an available action, the client application may pass a query identifier associated with the action to the server. In response, the server executes the corresponding database query to generate a set of query results. In addition, the server may identify a set of actions available for the query results. Both the query results and the set of available actions are extracted from database tables. The query results and the set of available actions are returned to the client application. The client application may be configured to generate an interface display that presents both the query results and the set of available actions. The process can then be repeated as required.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable media. Illustrative computer-readable media include, but are not limited to: (i) non-writable storage media (e.g., read-only memory devices within a computer such as CD-ROM or DVD-ROM disks readable by a CD- or DVD-ROM drive) on which information is permanently stored; (ii) writable storage media (e.g., floppy disks within a diskette drive or hard-disk drive) on which alterable information is stored. Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
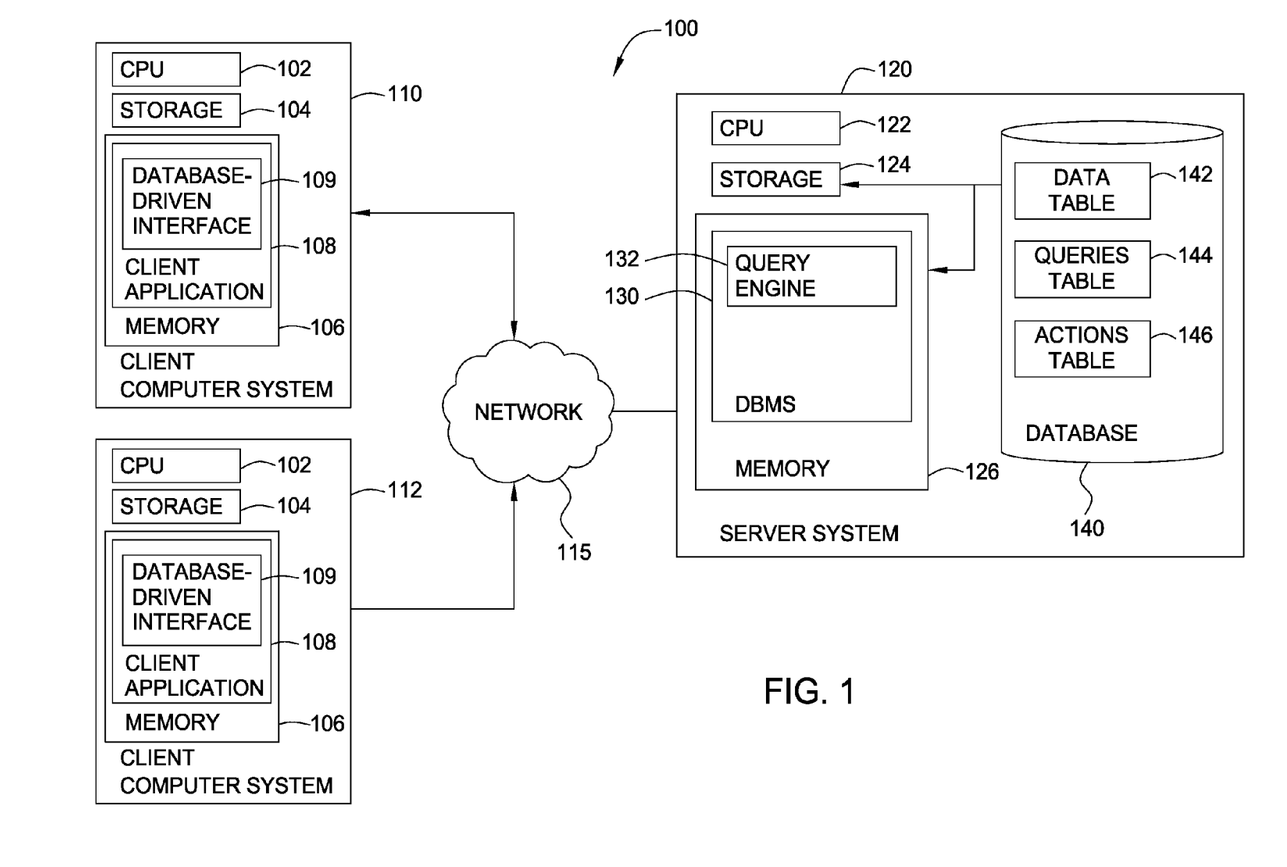
FIG. 1 is a block diagram that illustrates a client server view of a computing environment, according to one embodiment of the invention.

FIG. 1 is a block diagram that illustrates a client server view of computing environment 100, according to one embodiment of the invention. As shown, computing environment 100 includes two client computer systems 110 and 112, a network 115 and a server system 120. The computer systems illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104 and memory 106, typically connected by a bus (not shown). CPU 102 is a programmable logic device that performs all the instructions and logic processing performed in executing user applications. Storage 104 stores application programs and data for use by client computer systems 110 and 112. Storage 104 includes hard-disk drives, flash memory devices, optical media and the like. Network 115 generally represents any kind of data communications network. Accordingly, network 115 may represent both local and wide area networks, including the Internet. Client computer systems 110 and 112 can run a client application 108.

As shown, server system 120 also includes a CPU 122, storage 124, and memory 126. Storage 124 may store a database 140. The client application 108 uses network 115 to connect to a database management system (DBMS) 130, which manages a database 140. Illustratively, the database 140 includes a data table 142, a queries table 144, and an actions table 146. In one embodiment, the client application 108 generates a database-driven interface 109. The client application 108 provides a simple framework to display the database-driven interface 109. The interface content and functionality is provided to client application 108 by database 140 in response to queries submitted to DMBS 130. In contrast to conventional typical client applications in a client-server system, database 140 the interface functionality in the computer code of each interface screen, accessed through DBMS 130.

In one embodiment, the client application 108 initializes the database-driven interface 109 by transmitting a query identifier to the database 140. In response, the database 140 retrieves an initial query from the queries table 144 and executes the query. The database 140 returns the query results and the set of available actions to the client application 108. The client application 108 processes the query results and the set of available actions in order to generate the starting screen of the database-driven interface 109. In this embodiment, a set of actions is presented in the user interface as a set of commands available to the user. When a particular action is selected, an associated query is run in the database 140.

Figure 2:
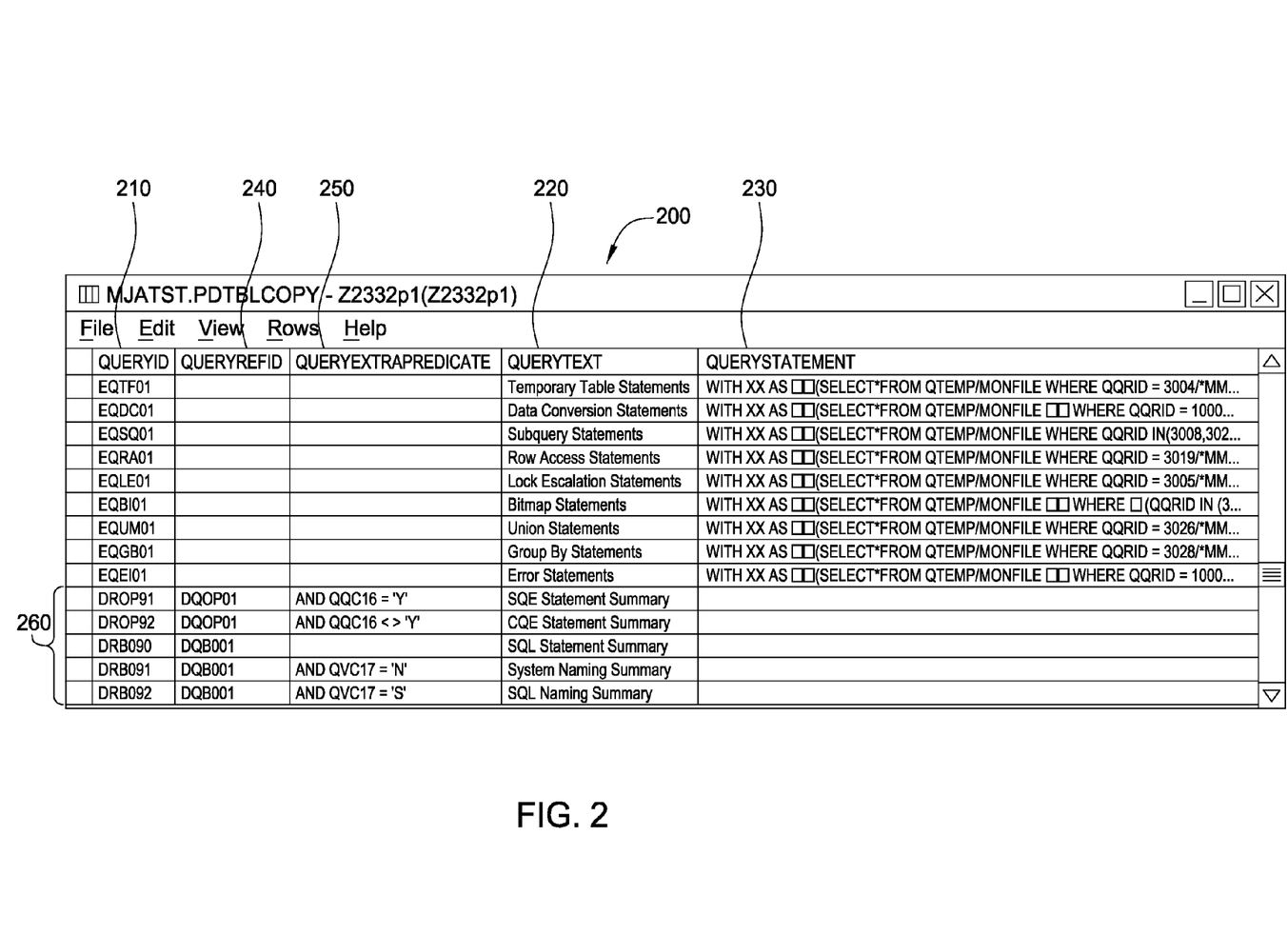
FIG. 2 illustrates a database queries table used to generate a database-driven interface, according to one embodiment of the invention.

FIG. 2 illustrates an example of a queries table 144. Illustratively, a queries table 200 comprises a QUERYID column 210, a QUERYTEXT column 220, a QUERYSTATEMENT column 230, a QUERYREFID column 240, and a QUERYEXTRAPREDICATE column 250. Each row in the queries table 200 defines a query, with a unique query identifier stored in QUERYID column 210. The QUERYTEXT column 220 stores the text to be displayed to the user when that query is available as an action in the database-driven interface 109. The QUERYSTATEMENT column 230 stores the query statement in the SQL language. The query statement is the database command that is executed when the corresponding query identifier is received by the DBMS 130. Additionally, different actions may use the same query with different query predicates. For example, rows 260 of the queries table 200 include the QUERYREFID column 240 indicating a different query in the queries table 200. The values in the QUERYEXTRAPREDICATE column 250 may be used to modify the query referenced by the QUERYREFID column 240, thus creating a new query by adding a predicate to an existing query.

Figure 3:
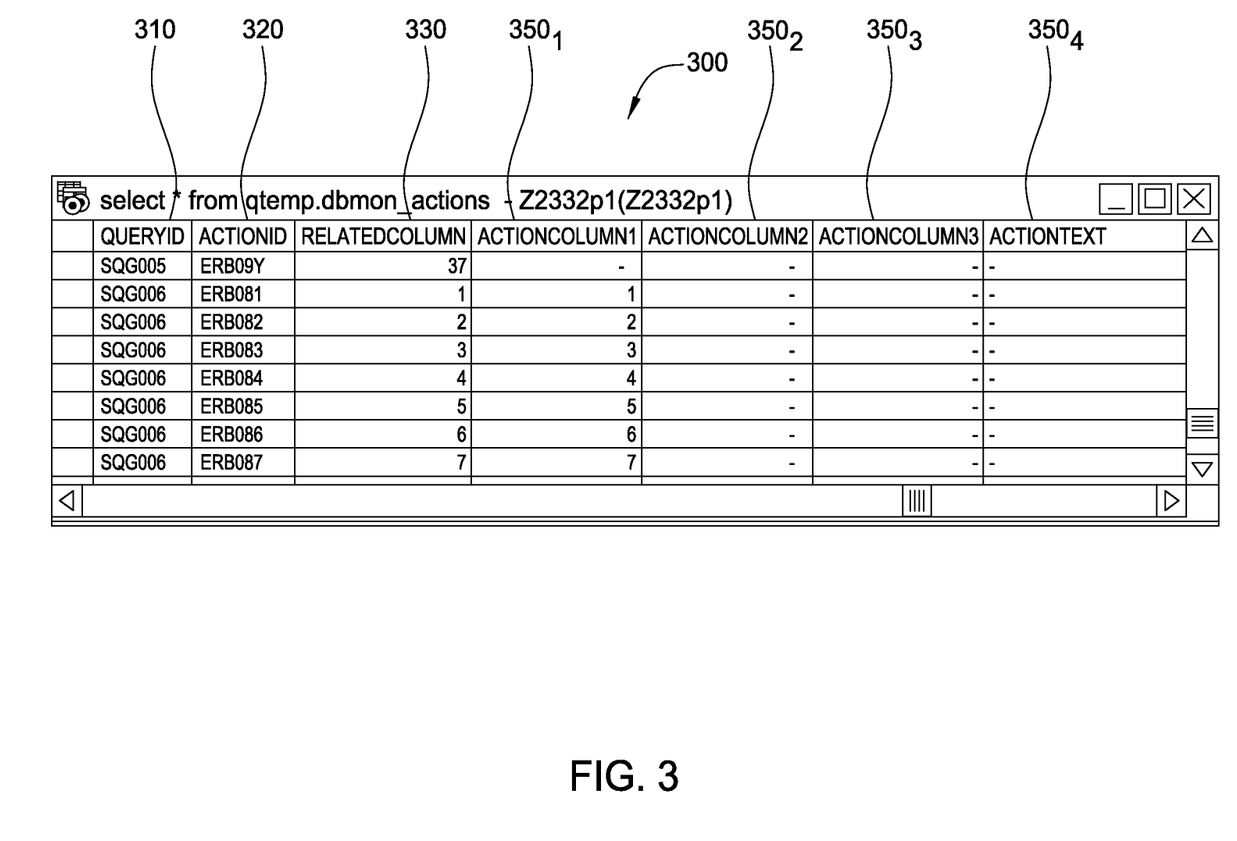
FIG. 3 illustrates a database actions table used to generate a database-driven interface, according to one embodiment of the invention.

FIG. 3 illustrates an example of an actions table 146. Illustratively, an actions table 300 includes a QUERYID column 310, an ACTIONID column 320, RELATEDCOLUMN column 330, an ACTIONCOLUMN1 column $350_1$, and other columns $350_{2-4}$. In one embodiment, each row in the actions table 300 defines an action, with a unique action identifier stored in ACTIONID column 320. In each row of actions table 300, the QUERYID column 310 stores an identifier for the query which invokes the action described in that row. When a query invokes an action, the query results can provide an input to the action. The input to the action is specified by the RELATEDCOLUMN column 330, which stores the column number of the query results to be used as an input. The ACTIONCOLUMN1 column $350_1$ stores the column number of the action that will receive the input specified in the RELATEDCOLUMN column 330. The other ACTIONCOLUMN columns $350_{2-4}$ are used to format the action output, similarly to the function of the ACTIONCOLUMN1 column $350_1$.

Figure 4:
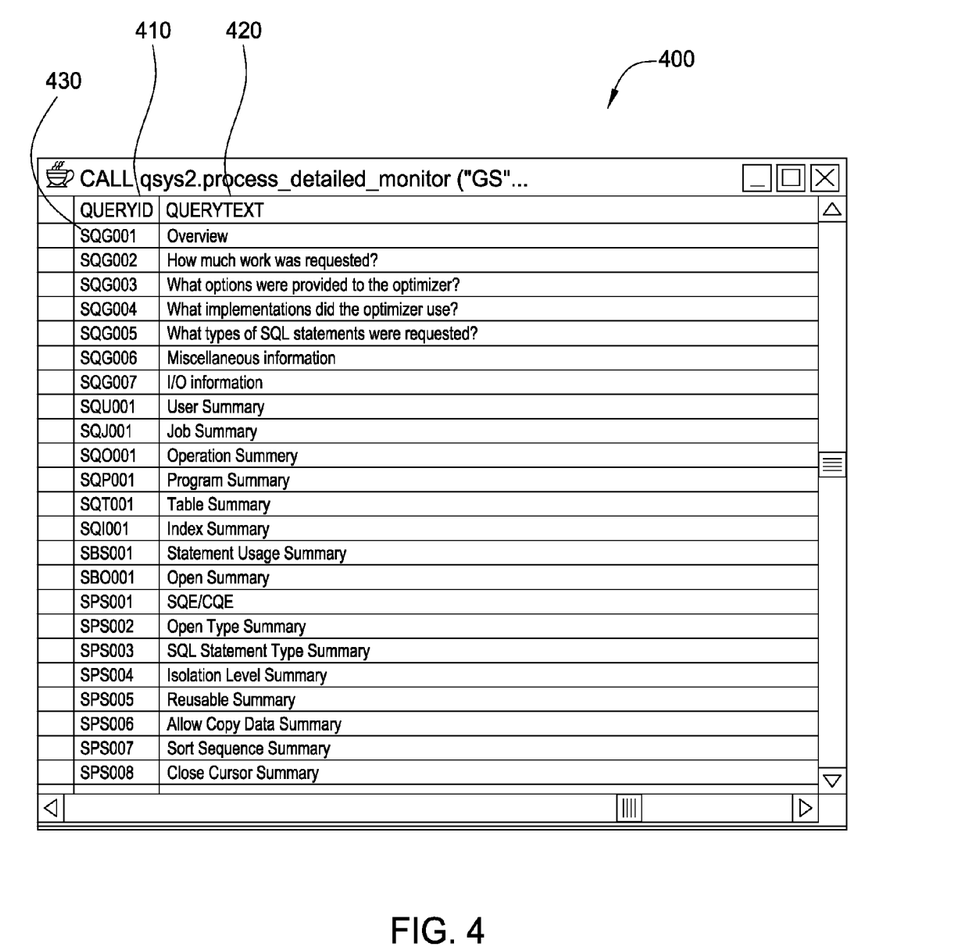
FIG. 4 illustrates an example of the results of an initial database query for displaying a database-driven interface, according to one embodiment of the invention.
Figure 5A:
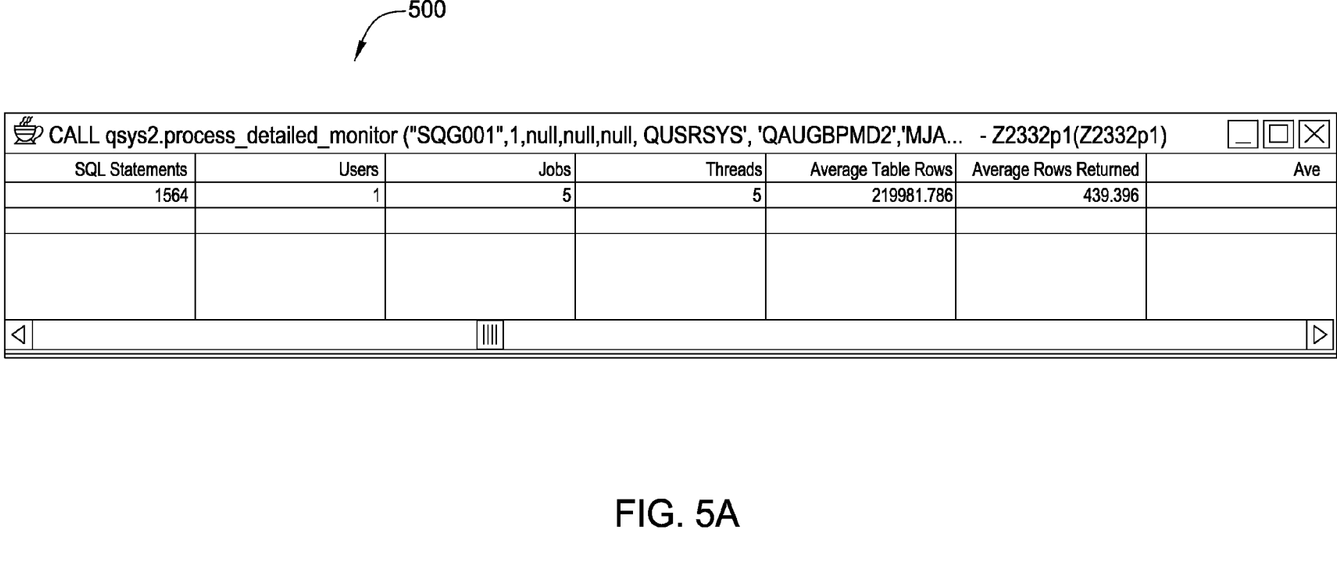
FIGS. 5A-5B illustrate an example of a database-driven interface generated from the database tables of FIGS. 3 and 4, according to one embodiment of the invention.
Figure 5B:
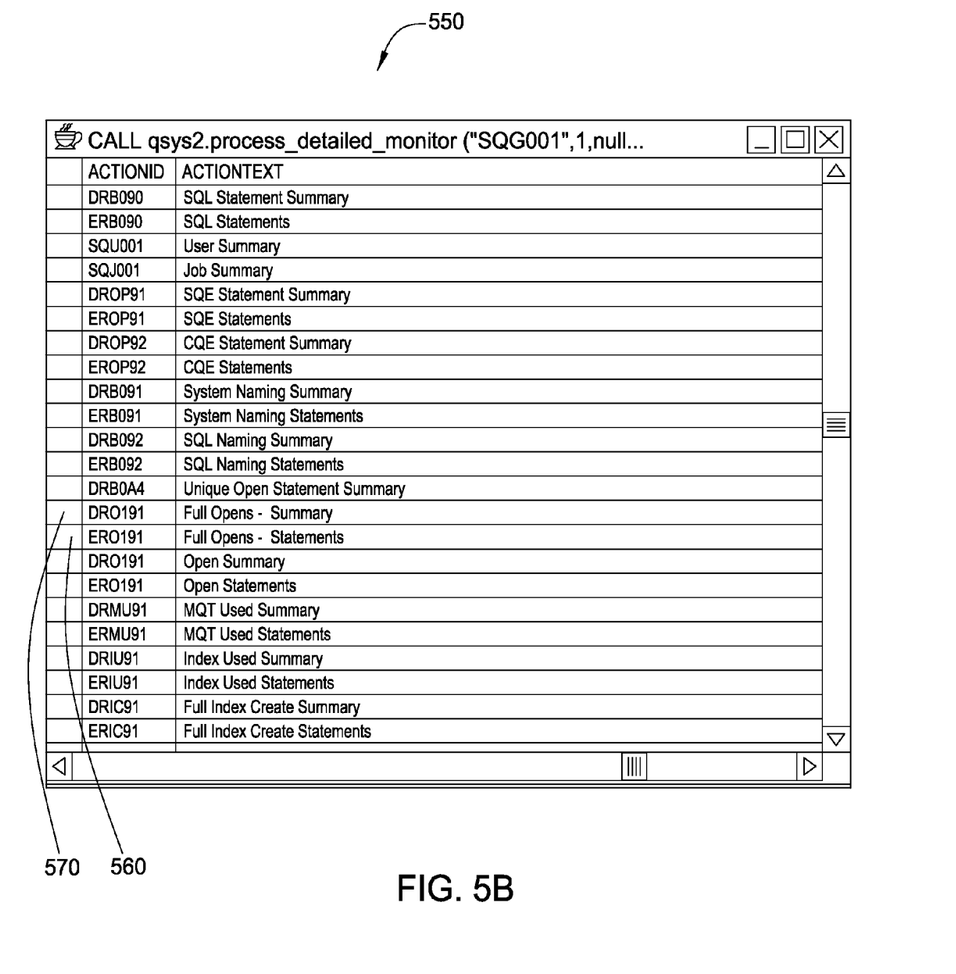
Figure 6:
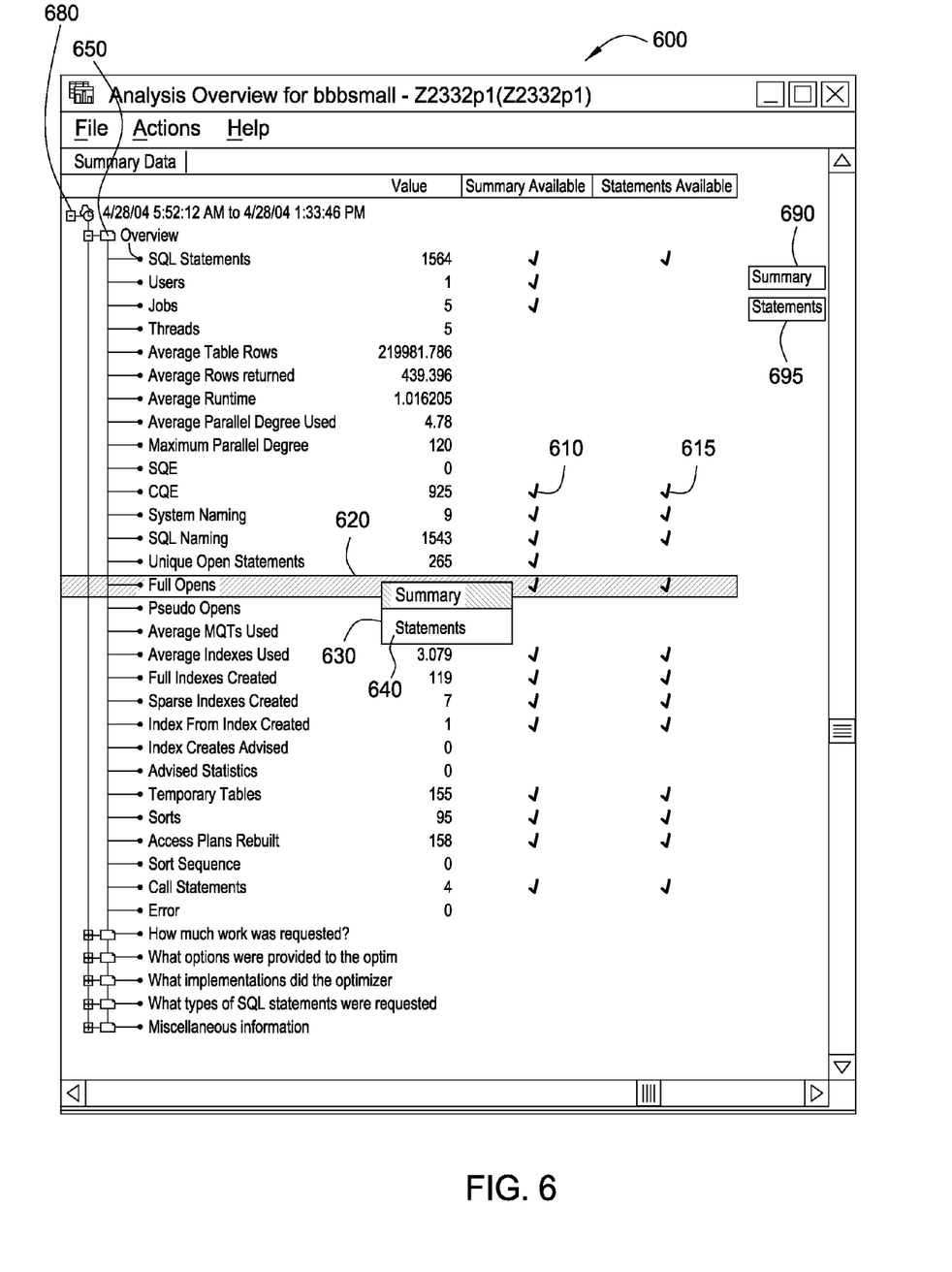
FIG. 6 illustrates an example screen display of a database-driven interface after the user has made an initial selection, according to one embodiment of the invention.

One embodiment of the invention is illustrated in FIGS. 4-6 using an example of a database performance monitoring application. This application 108 allows a user interacting with database-driven interface 109 to monitor the performance of a remote database server. In this example, the queries table 144 and the actions table 146 are configured as in the illustrated queries table 200 and actions table 300, respectively. In this example, the database performance monitoring application is initialized by the client application 108 passing a query identifier to the database 140. In response, the database 140 determines the initial query from the queries table 200 associated with the query ID, executes the query, and returns the query results. FIG. 4 illustrates a database table storing a set of initial query results 400. The initial query results 400 comprise the set of queries that are available to the particular user or location. As shown, the initial query results 400 include a set of queries identifiers 410, as well as the associated query text descriptions 420 that will be displayed to the user by database driven interface 109. In this example, the first row 430 of the results comprises a query identifier storing the value "SQG001," and a query text storing the value "Overview."

FIG. 6 illustrates an example screen display generated using a database-driven interface, according to one embodiment of the invention. More specifically, FIG. 6 illustrates an example screen display 600 of a database-driven interface generated from a set of query results 400 shown in FIG. 4, as well as a set of query results 500 shown in 5A and a table of actions 550 shown in FIG. 5B. As shown, query results 400 are represented using folder tree 680. Each folder of folder tree 680 represents a row from query results 400. In addition, each folder is associated with one of the query identifiers 410 of the query results 400. The label for each folder is taken from the text descriptions 420. Selecting one of the folders of folder tree 680 triggers the query associated with that folder to be executed. The particular query associated with each folder of folder tree 680 may be identified by the query identifiers 410 shown in FIG. 4.

Also, FIG. 6 displays the elements of an "Overview" folder 650. As stated, the "Overview" folder 650 is associated with the query identifier "SQG001" in the database 140 (shown in row 430 of FIG. 4). Thus, selecting the "Overview" folder 650 causes the query corresponding to the query identifier "SQG001" to be executed. After running this query, the database 140 returns the query results 500 illustrated in FIG. 5A, along with the table of actions 550 illustrated in FIG. 5B which define the interface actions available for query results 500. In one embodiment, database-driven interface 109 updates the display presented to the user based on both the query results for a given query (e.g., query results 500) and the set of actions associated with the query results (e.g., actions 550). Note, in one embodiment, the tables shown in FIGS. 5A and 5B may not be presented to a user directly, but instead used by database-driven interface 109 to generate an updated display (e.g., display 600 shown in FIG. 6).

The elements included in "Overview" folder 650 display the query results 500. For example, as shown in FIG. 6, the text label displayed for each element of "Overview" folder 650 is taken from the column names included in query results 500. Thus, FIG. 6 shows "SQL Statements", "Users", "Jobs", etc. as elements of "Overview" folder 650. Additionally, the query results returned from executing the "SQG001" query are displayed as part of the elements of the "Overview" folder 650. For example, the value for the "Jobs" element shows the actual query results value of "5" taken from the "Jobs" column of query results 500.

Further, database-driven interface 109 may associate the actions available for a given set of query results. Actions 550 shown in FIG. 5B includes the actions available with the query results returned for the "SQG001" query. In this example, the rows of FIG. 5B indicate the availability of a "Summary" action or a "Statement" action for a particular element of the "Overview" folder 650. Using this information, database-driven interface 109 may be configured to present a display of what actions are available for a given set of query results. For example, screen display 600 shown in FIG. 6 illustrates the actions available for the elements of the "Overview" folder 650 using checkmarks 610 (indicating whether the summary action is available) and 615 (indicating whether a statement action is available).

Like the "Overview" folder 650, when a user selects one of the other folders in folder tree 680, database driven interface 109 may be configured to execute the query associated with the selection and display a set of query results and available actions. Of course, although shown as a hierarchical collection of folders, a person skilled in the art will recognize that the screen displays generated by database-driven interface for a particular set of query results and actions may employ user interface constructs tailored to suit the needs of an individual case.

Continuing the example of a database performance monitoring application, FIG. 6 shows screen display 600 after the user has selected the row 620 labeled "Full Opens." In response, the user is presented with a pop-up menu 630. The pop-up menu 630 allows the user to invoke one of the available actions 640, which are derived from the rows 560 and 570 of the available actions 550. Additionally, the availability of these actions may be invoked as buttons 690 and 695. In this example, assume the user has selected the "Statements" action from pop-up menu 630, triggering the query identified by the action ID of "ERO191" shown in row 570 of the table of actions 550. In response, the database 140 executes this query and returns a set of query results and corresponding set of available actions used in order to update the database-driven interface 109.

Figure 7:
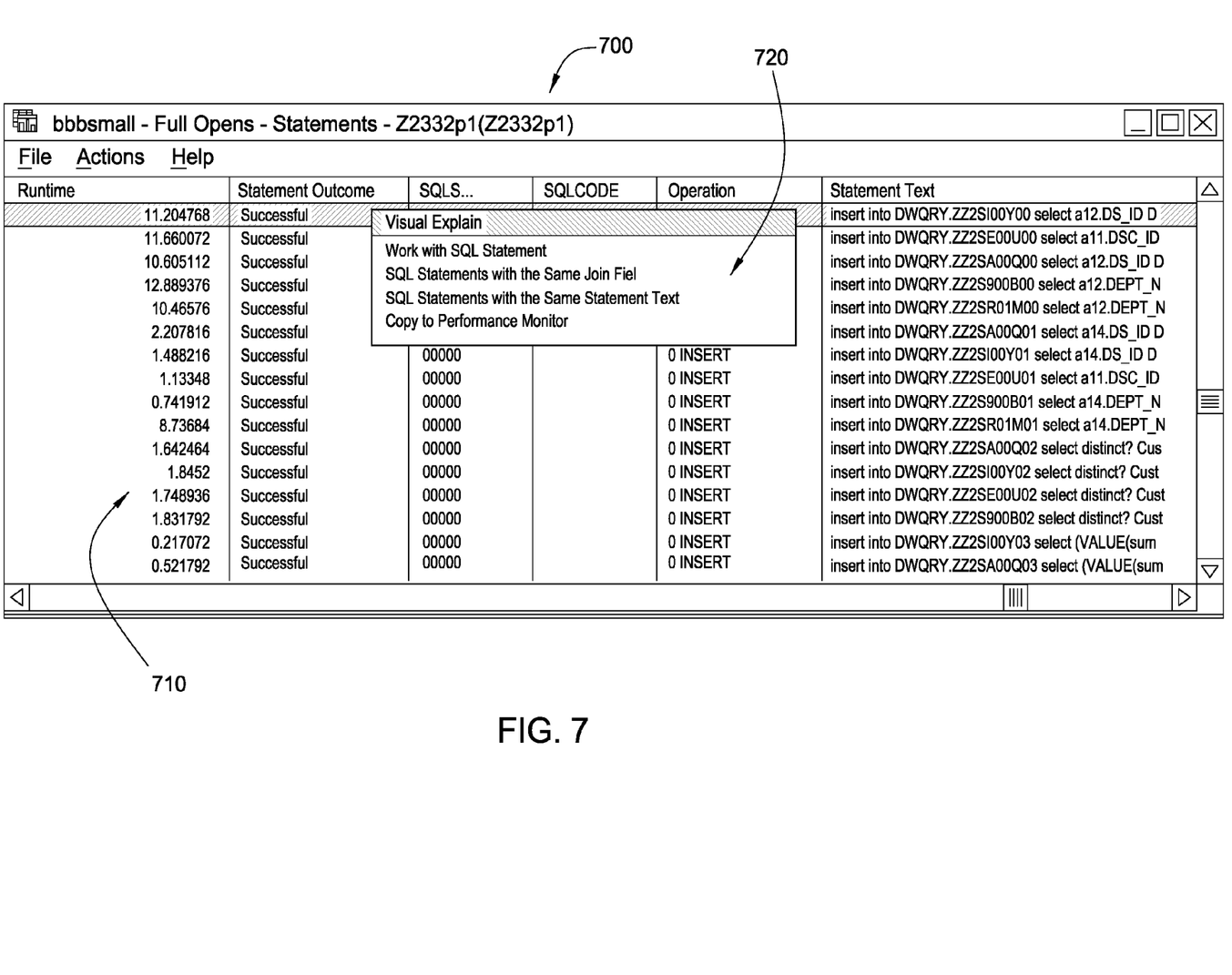
FIG. 7 illustrates another screen display generated by database driven interface, according to one embodiment of the invention.

FIG. 7 illustrates another screen display 700 generated by database driven interface 109, according to one embodiment of the invention. Illustratively, screen display 700 may be generated in response to a user selecting the "Statement" action of screen display 600. As shown, the query results 710 are presented as rows and columns, and the set of available actions is presented in a pop-up box 720. Also, the user has the option of selecting further actions from the pop-up box 720. One of ordinary skill in the art will recognize that this process of retrieving queries and actions from the database can be repeated as often as needed, without requiring the extensive coding of multiple display screens.

Figure 8:
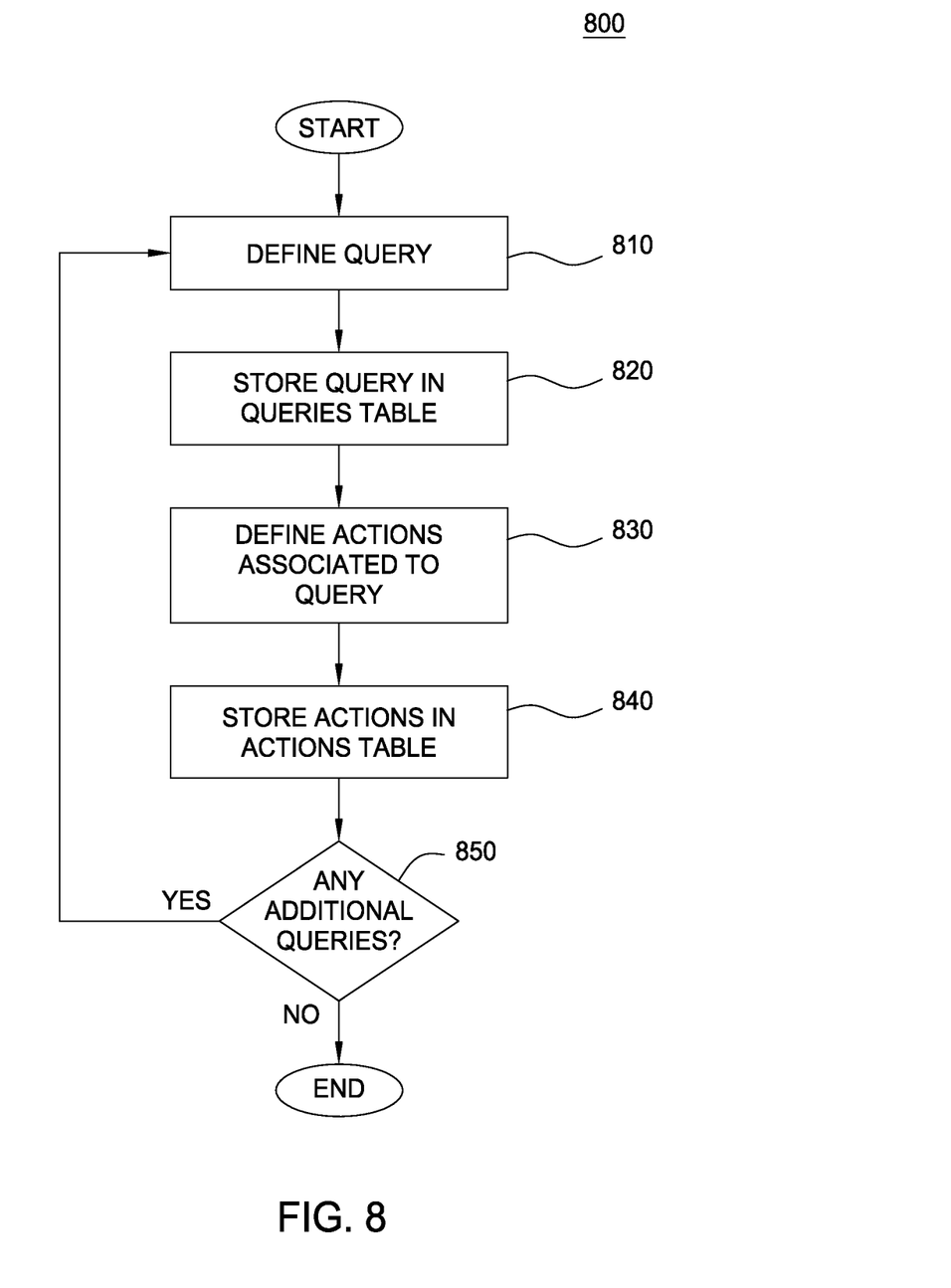
FIG. 8 illustrates a method for configuring actions available for a client using a database-driven interface, according to one embodiment of the invention.

FIG. 8 illustrates a method 800 for configuring a new database-driven interface 109, according to one embodiment of the invention. The method 800 begins at step 810, where a new query is defined. At step 820, the query is stored in the queries table 144. At step 830, a set of actions that will be associated to the query results is defined. At step 840, the set of actions is stored in the actions table 146. At step 850, a determination is made of whether additional levels are required in the client-server application. If more levels are required, then method 800 starts over at step 810. If no additional levels are required, then method 800 ends.

One advantage of method 800 is the ease of user customization. For example, the corporate IT staff of a large insurance company could create a client application providing a database-driven interface, and then distribute the application to all of its local branch offices. In addition, the corporate IT staff could use the method 800 to create pre-defined sets of queries and actions to interact with a corporate underwriting database. In this example, a person at a branch office could create a custom menu of underwriting options available to the agents at that office. Since the customization of the branch office menu could be done simply by selecting queries and actions in database tables, there is no need for technical expertise at the branch office, for custom coding, or for updating of client software.

Figure 9:
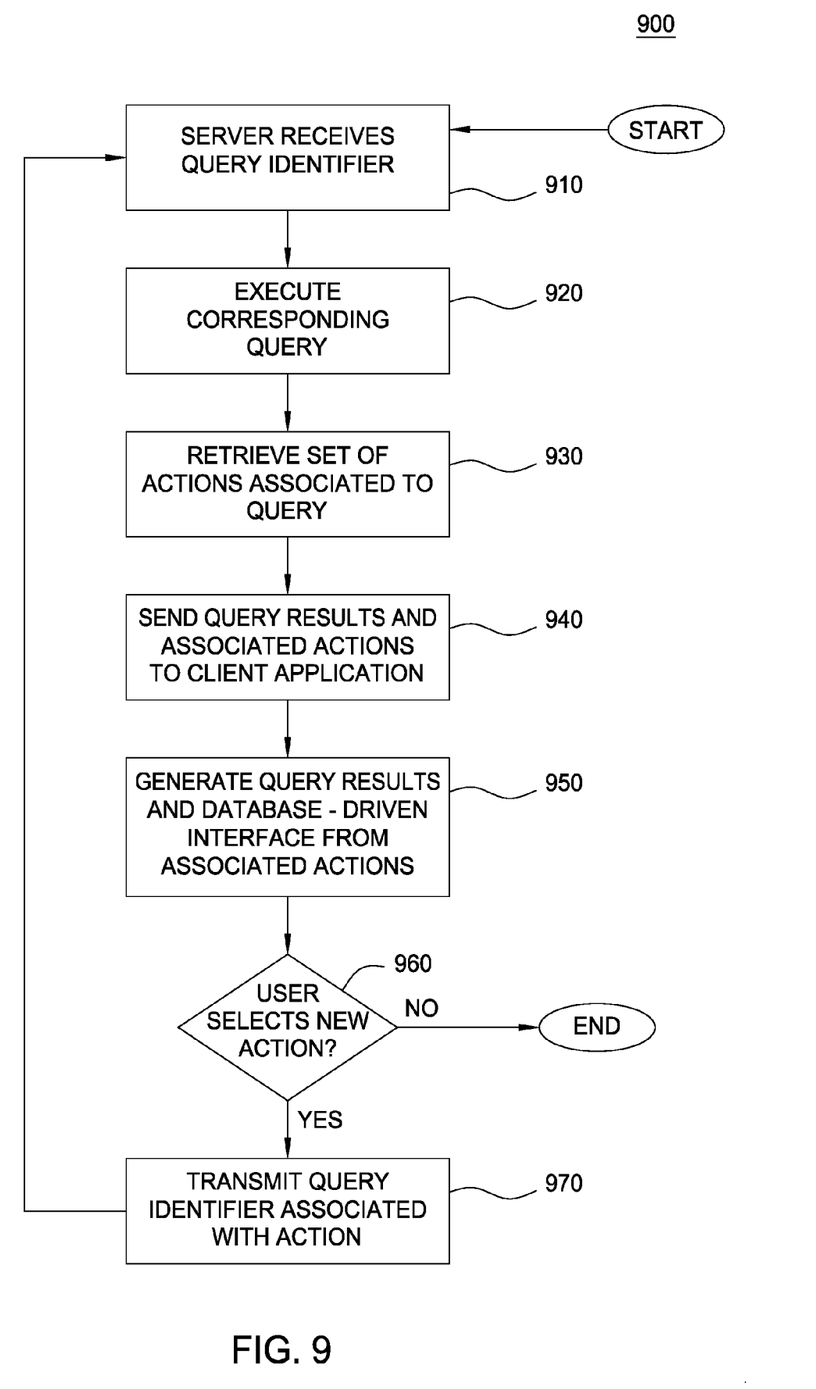
FIG. 9 illustrates a method for generating a database-driven interface, according to one embodiment of the invention.

FIG. 9 illustrates a method 900 for providing a database-driven interface from data, queries, and actions stored in database tables, according to one embodiment of the invention. The method 900 begins at step 910, when the server receives a query identifier. In step 920, a query is identified from the received query identifier. For example, as described above, a queries table 200 could be used to match a QUERYID column 210 to a QUERYSTATEMENT column 230. The query is executed, and a set of query results is generated. At step 930, the set of actions associated to the query are identified. For example, as described above, an actions table 300 could used to match a QUERYID column 310 to an ACTIONID column 320. At step 940, the set of query results and the set of associated actions are sent to the client application 108. At step 950, the client application 108 processes the query results and the set of associated actions to generate a database-driven interface 109. At step 960, the user may select an available action. At step 970, the query identifier that is associated with the selected action is passed back to the server for execution, and the method 900 is then repeated. However, if no further actions are selected at step 960, the method 900 ends.

As described, each of the actions available in the database-driven interface runs a database query. However, in another embodiment, an action is not limited to running a query. A person skilled in the art recognizes that an action could trigger a system event outside of the database. For example, a database-driven interface 109 could be used as a network device controller. The data table 142 could store a list of network devices, and the queries table 144 could include a query to select a set of network devices available to a specific user. Further, the actions table 146 could store the available actions to control those devices, such as switching the device on or off, rebooting the device, etc. Each action in the actions table 146 would not be linked to a database query, but would instead be linked to a command in a network device interface. In this example, an initial query would be run to determine the devices and actions available to a specific user. The database-driven interface 109 interface would then display to the user the set of the devices that he has access to, and allow him to select from the set of available actions to interact with the devices. Once the user selects a specific device and action, the linked command would be carried out by the network device interface.

While the foregoing is directed to embodiments of the present invention, other and further embodiments of the invention may be devised without departing from the basic scope thereof, and the scope thereof is determined by the claims that follow.

What is claimed is:

1. A computer-implemented method of providing a database-driven user interface for an application, the method comprising:

receiving a query identifier from a set of query identifiers, wherein each query identifier corresponds to a database query in a set of database queries;

executing the database query associated with the received query identifier to generate a set of query results describing a configuration for the database-driven user interface;

identifying a set of actions associated with the set of query results and invoked using the database-driven user interface as configured by the configuration described by the set of query results, wherein each action, when invoked, controls an operational flow associated with the application; and returning the set of query results and the set of actions to a client component of the database-driven user interface, wherein the client component is configured to update the database-driven user interface for the application based on both (i) the configuration described in the set of query results and (ii) the set of actions, and wherein the client component is configured to allow a user to invoke each of the set of actions to control the respective operational flow of the application.

2. The method of claim 1, wherein each query and associated query identifier are stored in a row of a queries table.

3. The method of claim 2, wherein a given row of the queries table includes one or more query predicates to use when executing the query identified by the query identifier in the given row.

4. The method of claim 1, wherein each action is associated with one of the query identifiers is stored as a row of a database actions table.

5. The method of claim 1, wherein the database queries are composed according to the structured query language (SQL).

6. The method of claim 1, wherein each action, of the set of actions, is associated with one or more of the set of the query identifiers, and further comprising, when a given action is invoked by the user, transmitting the query identifier associated with that action to a server component of the database-driven interface.

7. A computer readable storage device containing a program which, when executed, performs an operation for providing a database driven user interface for an application, comprising:

receiving a query identifier, from a set of query identifiers, wherein each query identifier corresponds to a database query in a set of database queries;

executing the database query associated with the received query identifier to generate a set of query results describing a configuration for the database-driven user interface;

identifying a set of actions associated with the set of query results and invoked using the user database-driven interface as configured by the configuration described by the set of query results, wherein each action, when invoked, controls an operational flow associated with the application; and returning the set of query results and the set of actions to a client component of the database-driven user interface, wherein the client component is configured to update the database-driven user interface for the application based on both (i) the configuration described in the set of query results and (ii) the set of actions, and wherein the client component is configured to allow a user to invoke each of the set of actions to control the respective operational flow of the application.

8. The computer readable storage device of claim 7, wherein each query and associated query identifier are stored in a row of a queries table.

9. The computer readable storage device of claim 8, wherein a given row of the queries table includes one or more query predicates to use when executing the query identified by the query identifier in the given row.

10. The computer readable storage device of claim 7, wherein each action is associated with one of the query identifiers is stored as a row of a database actions table.

11. The computer readable storage device of claim 7, wherein the database queries are composed according to the structured query language (SQL).

12. The computer readable storage device of claim 7, wherein each action, of the set of actions, is associated with one or more of the set of the query identifiers, and wherein the operations further comprise:

when a given action is invoked, transmitting the query identifier associated with that action to a server component of the database-driven interface.

13. A system, comprising:

a processor; and a memory containing a program configured for providing a database-driven interface for an application, wherein the program is configured to:

receive a query identifier, from a set of query identifiers, wherein each query identifier corresponds to a database query in a set of database queries;

execute the database query associated with the received query identifier to generate a set of query results describing a configuration for the database-driven user interface;

identify a set of actions associated with the set of query results and invoked using the database-driven user interface as configured by the configuration described by the set of query results, wherein each action, when invoked, controls an operational flow associated with the application; and return the set of query results and the set of actions to a client component of the database-driven user interface, wherein the client component is configured to update the database-driven user interface for the application based on both (i) the configuration described in the set of query results and (ii) the set of actions, and wherein the client component is configured to allow a user to invoke each of the set of actions to control the respective operational flow of the application.

14. The system of claim 13, wherein each query and associated query identifier are stored in a row of a queries table.

15. The system of claim 14, wherein a given row of the queries table includes one or more query predicates to use when executing the query identified by the query identifier in the given row.

16. The system of claim 13, wherein each action is associated with one of the query identifiers is stored as a row of a database actions table.

17. The system of claim 13, wherein the database queries are composed according to the structured query language (SQL).

18. The system of claim 13, wherein each action, of the set of actions, is associated with one or more of the set of the query identifiers, and wherein the program is further configured to:

when a given action is invoked by the user, transmitting the query identifier associated with that action to a server component of the database-driven interface.

* * * * *